(12) United States Patent
Baldwin

(10) Patent No.: US 10,637,222 B1
(45) Date of Patent: Apr. 28, 2020

(54) LOW PROFILE ELECTRICAL DEVICE COVER

(71) Applicant: Jeffrey P. Baldwin, Phoenix, AZ (US)

(72) Inventor: Jeffrey P. Baldwin, Phoenix, AZ (US)

( * ) Notice: Subject to any disclaimer, the term of this patent is extended or adjusted under 35 U.S.C. 154(b) by 356 days.

(21) Appl. No.: 15/461,340

(22) Filed: Mar. 16, 2017

Related U.S. Application Data

(60) Provisional application No. 62/309,066, filed on Mar. 16, 2016.

(51) Int. Cl.
| | | |
|---|---|---|
| *H01H 9/02* | (2006.01) | |
| *H02G 3/14* | (2006.01) | |
| *H02G 3/10* | (2006.01) | |
| *H02G 3/08* | (2006.01) | |

(52) U.S. Cl.
CPC ............ *H02G 3/14* (2013.01); *H02G 3/081* (2013.01); *H02G 3/10* (2013.01)

(58) Field of Classification Search
CPC ............ H02G 3/14; H02G 3/081; H02G 3/10; H02G 3/08; H02G 3/086; H02G 3/088; H05K 5/00; H05K 5/02; H05K 5/0004; H05K 5/0052; B65D 43/164; B65D 43/165; E05D 7/0009; E05D 7/00; E05D 7/0027; E05D 2005/108; E05F 1/1207; E05F 1/1215; H01R 13/6395; H01R 13/447; H01R 13/4532
USPC ... 220/3.8, 536, 203.1, 203.23, 203.26, 246, 220/323, 829, 830, 348, 3.94, 3.92, 844, 220/843, 836, 810; 16/50, 61, 63, 277, 16/304, 285; 174/559–561, 520, 58, 135, 174/50, 57, 60, 67; 439/135, 142, 147, 439/535, 536, 538
See application file for complete search history.

(56) References Cited

U.S. PATENT DOCUMENTS

| | | | | |
|---|---|---|---|---|
| 3,200,989 A | * | 8/1965 | Hubbell | H01R 13/447 220/242 |
| 4,073,038 A | * | 2/1978 | Curry | E05F 1/1215 16/301 |
| 4,419,788 A | * | 12/1983 | Prout | E05F 1/1215 16/300 |

(Continued)

FOREIGN PATENT DOCUMENTS

| | | | | |
|---|---|---|---|---|
| CH | 560474 | * | 3/1975 | H02G 3/14 |

OTHER PUBLICATIONS

Rease, C.L. How to Coutnersink a Hole in Metal, Nov. 2009, itstillruns, p. 1 (Year: 2009).*

*Primary Examiner* — Gideon R Weinerth
(74) *Attorney, Agent, or Firm* — Booth Udall Fuller, PLC

(57) ABSTRACT

An electrical outlet cover assembly having a base and a lid is disclosed. The base comprises a first base hinge aperture, and the lid comprises a first lid hinge aperture. The lid is hingedly coupled to the base by at least a first pin. The first pin is rotatably coupled to one of the first lid hinge aperture and the first base hinge aperture, and rotationally fixed with respect to the other of the first lid hinge aperture and the first base hinge aperture. The lid is biased from an open position to a closed position by a rotational bias from a bias element that is mechanically engaged with an end of the first pin and with an anchor rotationally fixed with respect to one of the lid and the base. The first pin may include teeth and is rotationally fixed with respect to complementary teeth of a hinge aperture.

18 Claims, 17 Drawing Sheets

(56) References Cited

U.S. PATENT DOCUMENTS

| | | | | |
|---|---|---|---|---|
| 5,456,377 | A * | 10/1995 | Williams, Jr. | H02G 3/14 |
| | | | | 220/242 |
| 5,584,100 | A * | 12/1996 | Doyle | E05F 1/1215 |
| | | | | 16/299 |
| 5,715,574 | A * | 2/1998 | Schall | E05F 1/1215 |
| | | | | 16/301 |
| 6,460,220 | B1 * | 10/2002 | Jackson | E05F 1/1215 |
| | | | | 16/285 |
| 6,732,408 | B2 * | 5/2004 | Wu | E05D 11/00 |
| | | | | 16/273 |
| 7,626,121 | B1 * | 12/2009 | Cleghorn | H02G 3/14 |
| | | | | 174/53 |
| 8,245,353 | B2 * | 8/2012 | Homner | E05F 1/1215 |
| | | | | 16/298 |
| 8,251,253 | B1 * | 8/2012 | Cleghorn | H01H 9/02 |
| | | | | 174/50 |
| 9,203,222 | B2 * | 12/2015 | Korcz | H02G 3/088 |
| 9,680,292 | B2 * | 6/2017 | Wijaya | H02G 3/085 |
| 2007/0000087 | A1 * | 1/2007 | Hour | E05F 1/063 |
| | | | | 16/50 |
| 2007/0181328 | A1 * | 8/2007 | Dinh | H02G 3/086 |
| | | | | 174/50 |
| 2010/0181091 | A1 * | 7/2010 | Drane | H02G 3/088 |
| | | | | 174/66 |
| 2012/0111597 | A1 * | 5/2012 | Korcz | H02G 3/088 |
| | | | | 174/67 |
| 2017/0022743 | A1 * | 1/2017 | Timothy | E05F 1/1207 |

* cited by examiner

SECTION A-A

SECTION B-B

LOW PROFILE ELECTRICAL DEVICE COVER

RELATED APPLICATIONS

This application claims the benefit of U.S. provisional patent application 62/309,066, filed Mar. 16, 2016 titled "Enclosure," the entirety of the disclosure of which is hereby incorporated by this reference.

TECHNICAL FIELD

Aspects of this document relate generally to electrical device covers.

BACKGROUND

Enclosures for electrical devices and outlets, particularly low profile enclosures with lightweight lids, often employ a spring-loaded hinge to keep the lids closed when not in use. Without the biased hinge, the lighter lids are subject to being blown open by the wind, or to remain slightly open thereby exposing the electrical outlet to the weather.

The utility of the spring-loaded hinge is balanced against a number of drawbacks. Many of the conventional enclosures only allow the lid to be open to approximately 70° to 135° above closed, in part due to the bulk of the spring-loaded hinge. The springs included in these enclosures can be divided into two main groups: flat springs and torsional springs. The enclosures that include flat springs typically have the disadvantage of the lid only opening to around 90° above closed. While the enclosures with torsional springs allow the lid to open further, they are very difficult (and thus more expensive) to assemble.

Additionally, enclosures are sometimes employed to prevent unauthorized access to a device or outlet. Some conventional enclosures can be used with a padlock. However the padlock does nothing to prevent an unauthorized person from removing the hinge pin to gain access. It is a significant disadvantage of all conventional plastic enclosures that include separate hinge pins that the hinge pin can be easily removed, lending the device or outlet exposed and unsecure.

SUMMARY

According to one aspect, an electrical outlet cover assembly includes a base comprising a first base hinge aperture and a second base hinge aperture, and a lid comprising a first lid hinge aperture, a second lid hinge aperture, and a lid face bordered by a lid skirt. The lid is hingedly coupled to the base by a first pin rotatably coupled to the first base hinge aperture and rotationally fixed with respect to the first lid hinge aperture. The lid is also hingedly coupled to the base by a second pin, separate from the first pin, rotationally fixed with respect to the second base hinge aperture and rotatably coupled to the second lid hinge aperture. The lid is movable, with respect to the base, between a closed position in which the base is contained within the lid skirt and an open position in which an angle between a substantially planar rear surface of the base and a majority of a lower edge of the lid skirt is at least 140°. The lid is biased from the open position to the closed position by a rotational bias from a bias element directly coupled to both the first pin and the second pin.

Particular embodiments may comprise one or more of the following features. The first pin and the second pin may each comprise teeth. The first lid hinge aperture may be toothed complementary to the teeth of the first pin. The second base hinge aperture may be toothed complementary to the teeth of the second pin. Each pin of the first pin and the second pin may be slideably movable between an engaged position in which the teeth of the pin are mated with one of the first lid hinge aperture and the second base hinge aperture and a disengaged position in which the pin may be rotatably coupled to both the lid and the base and a relative rotational phase between the first pin and the second pin may be adjustable through rotation of the pin. Each pin of the first pin and the second pin may be biased to the engaged position by a linear bias of the bias element, and a strength of the rotational bias of the bias element may change in response to adjustments of the relative rotational phase between the first pin and the second pin. The angle between the substantially planar rear surface of the base and the majority of the lower edge of the lid skirt while the lid is in the open position may be 180°. The lid face may comprise a lock aperture extending through the lid face, the base may comprise a lock receiver, and the lock receiver may extend through the lock aperture when the lid is in the closed position with respect to the base. Finally, each pin of the first pin and the second pin may comprise a pin head having a top surface, and an outer surface of the lid skirt may comprise a countersink for each of the first pin and the second pin such that, for each pin head, the top surface may be substantially level with, or lower than, a majority of the outer surface of the lid skirt proximate to the pin head.

According to another aspect of the disclosure, an electrical outlet cover assembly includes a base comprising a first base hinge aperture and a second base hinge aperture, and a lid comprising a first lid hinge aperture, a second lid hinge aperture, and a lid face bordered by a lid skirt. The lid is hingedly coupled to the base by a first pin rotatably coupled to the first base hinge aperture and rotationally fixed with respect to the first lid hinge aperture, and a second pin, separate from the first pin, rotationally fixed with respect to the second base hinge aperture and rotatably coupled to the second lid hinge aperture. The lid is movable, with respect to the base, between a closed position and an open position, and is biased from the open position to the closed position by a rotational bias from a bias element directly coupled to both the first pin and the second pin. The first pin and the second pin each comprise teeth. The first lid hinge aperture is toothed complementary to the teeth of the first pin, and the second base hinge aperture is toothed complementary to the teeth of the second pin. Each pin of the first pin and the second pin is slideably movable between an engaged position in which the teeth of the pin are mated with one of the first lid hinge aperture and the second base hinge aperture and a disengaged position in which the pin is rotatably coupled to both the lid and the base. A relative rotational phase between the first pin and the second pin is adjustable through rotation of the pin. Each pin of the first pin and the second pin are biased to the engaged position by a linear bias of the bias element. A strength of the rotational bias of the bias element changes in response to adjustments of the relative rotational phase between the first pin and the second pin.

Particular embodiments may comprise one or more of the following features. The lid may further comprise a lid face bordered by a lid skirt, and the base may be contained within the lid skirt when the lid is in the closed position with respect to the base. The lid may further comprise a lid face bordered by a lid skirt having a lower edge, and an angle between a substantially planar rear surface of the base and a majority of the lower edge of the lid skirt may be at least 140° when the lid is in the open position with respect to the base. The lid may further comprise a lid face bordered by a lid skirt having an outer surface. Each pin of the first pin and the second pin may comprise a pin head having a top surface, and an outer surface of the lid skirt may comprise a countersink for each of the first pin and the second pin such that, for each pin head, the top surface may be substantially level with, or lower than, a majority of the outer surface of the lid skirt proximate to the pin head.

According to yet another aspect of the disclosure, an electrical outlet cover assembly includes a base comprising a first base hinge aperture, and a lid comprising a first lid hinge aperture. The lid is hingedly coupled to the base by at least a first pin. The first pin is rotatably coupled to one of the first lid hinge aperture and the first base hinge aperture, and rotationally fixed with respect to the other of the first lid hinge aperture and the first base hinge aperture. The lid is biased from an open position to a closed position by a rotational bias from a bias element mechanically engaged with an end of the first pin and with an anchor rotationally fixed with respect to one of the lid and the base.

Particular embodiments may comprise one or more of the following features. The first pin may further comprise teeth, and the one of the first lid hinge aperture and the first base hinge aperture to which the first pin is rotationally fixed may be toothed complementary to the teeth of the first pin. The other of the first lid hinge aperture and the first base hinge aperture to which the first pin is rotatably coupled may be toothless. The first pin may be slideably movable between an engaged position in which the teeth of the first pin are mated with the teeth of one of the first lid hinge aperture and the first base hinge aperture, and a disengaged position in which the first pin may be rotatably coupled to both the lid and the base. A relative rotational phase between the first pin and the anchor may be adjustable through rotation of the first pin. The first pin may be biased to the engaged position by a linear bias of the bias element. A strength of the rotational bias of the bias element may change in response to adjustments of the relative rotational phase between the first pin and the anchor. At least a portion of the lid skirt may be between the first pin and a majority of the base when the lid is in the open position with respect to the base. The lid may comprise a second lid hinge aperture. The base may comprise a second base hinge aperture, and the anchor may be a second pin that is separate from the first pin. The bias element may be directly coupled to the second pin. The second pin may be rotatably coupled to the second hinge aperture of the one of the lid and the base to which the first pin is rotationally fixed, and may be rotationally fixed to the second hinge aperture of the one of the lid and the base to which the first pin is rotatably coupled. The first pin may comprise a pin head having a top surface. The outer surface of the lid skirt may comprise a countersink for the first pin such that the top surface may be substantially level with, or lower than, a majority of the outer surface of the lid skirt proximate to the first pin.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

The inventions will hereinafter be described in conjunction with the appended drawings, where like designations denote like elements, and.

DETAILED DESCRIPTION

Figure 1A:
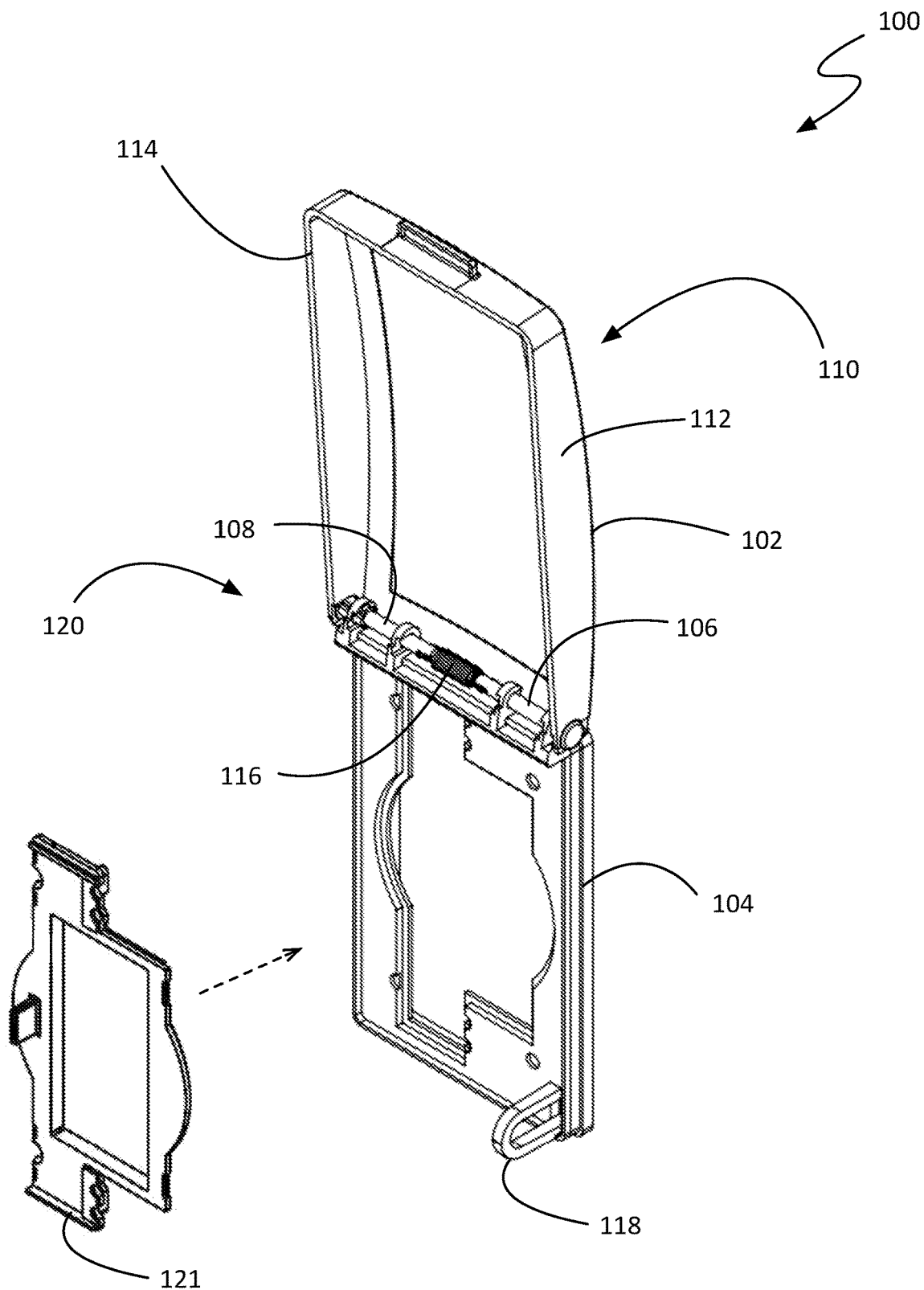
FIG. 1A is a front perspective view of an electrical outlet cover assembly in an open position.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Figure 1B:
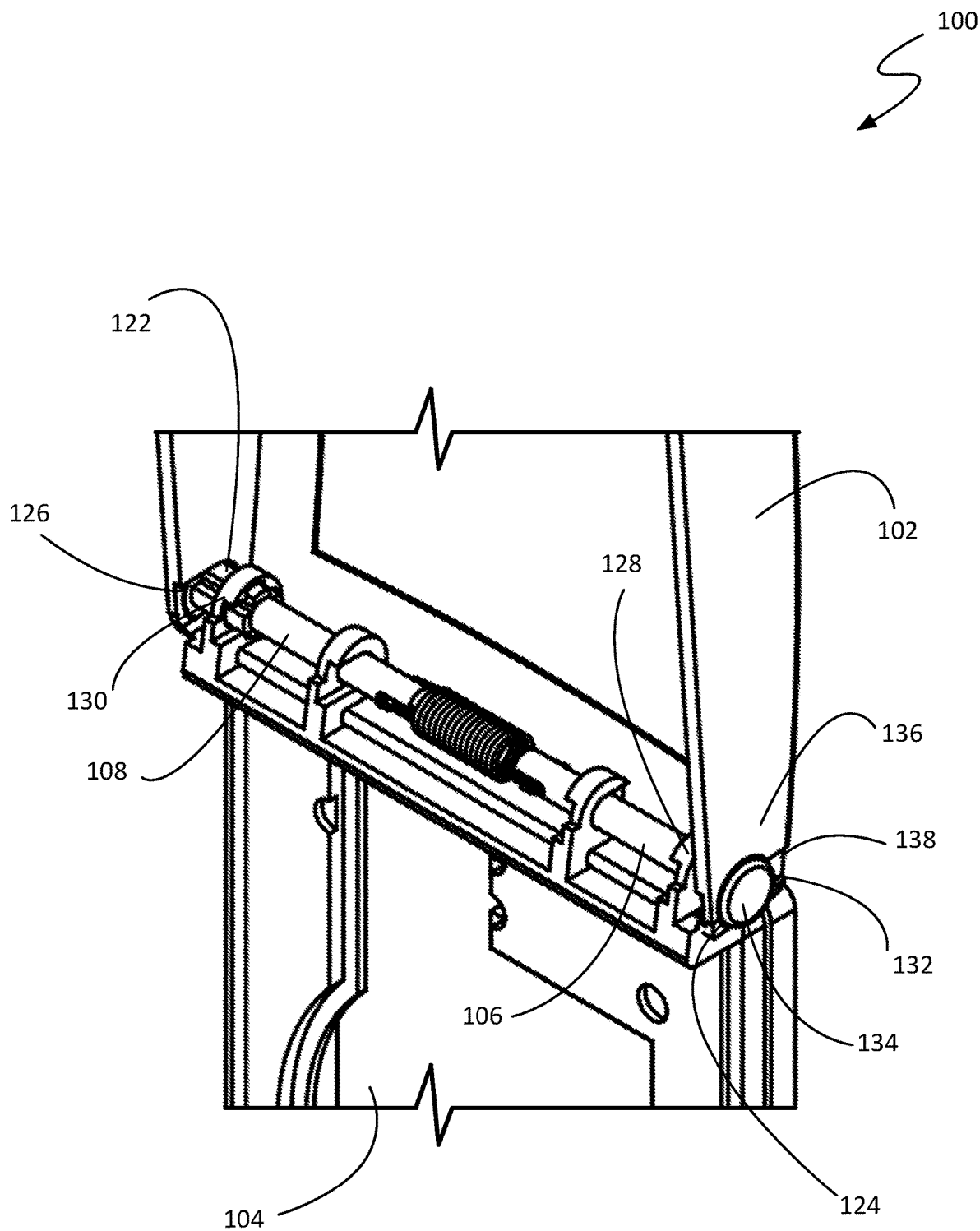
FIG. 1B is a close-up view of the electrical outlet cover assembly of FIG. 1A.
Figure 2:
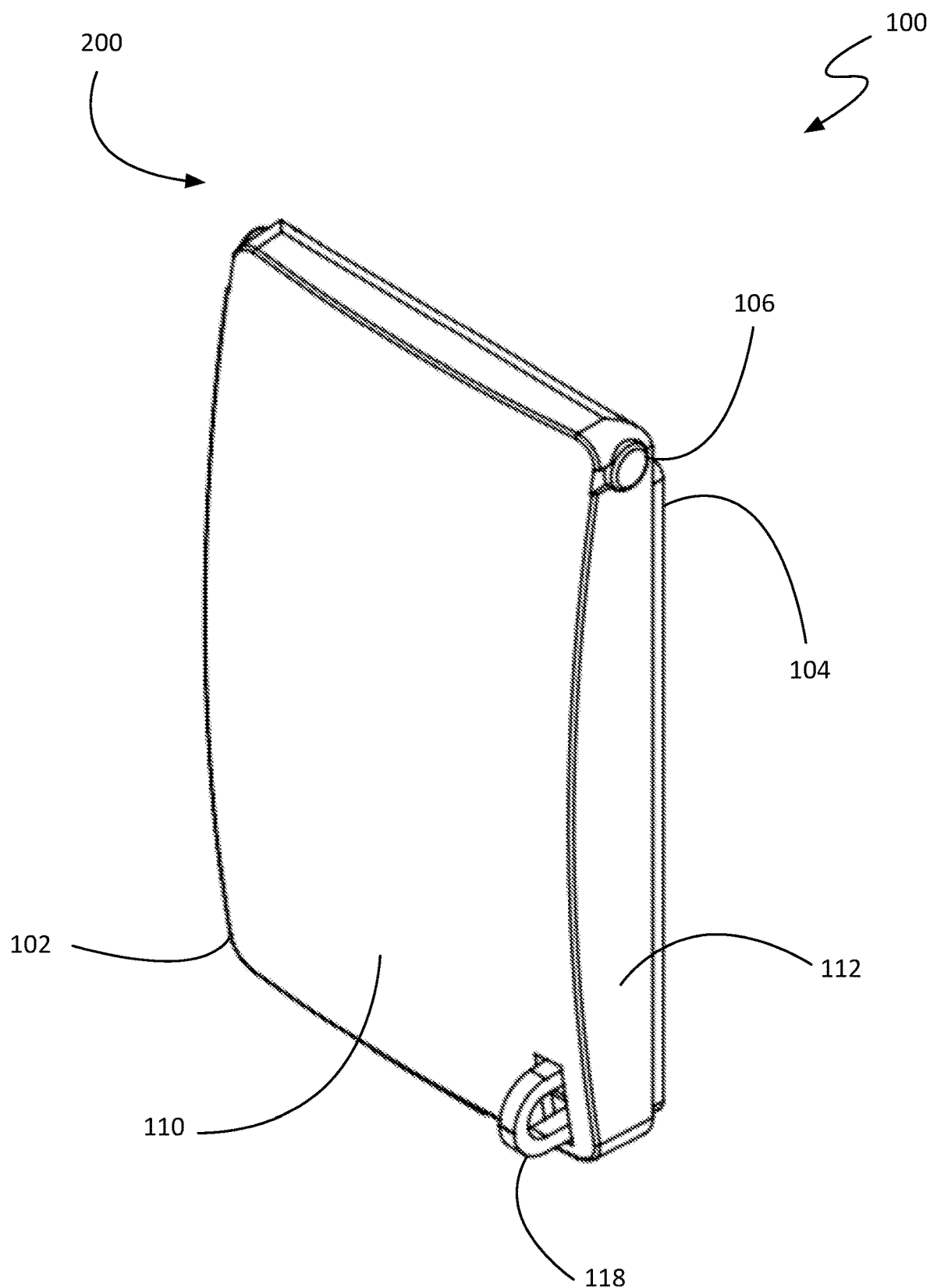
FIG. 2 is a front perspective view of an electrical outlet cover assembly in a closed position.
Figure 3:
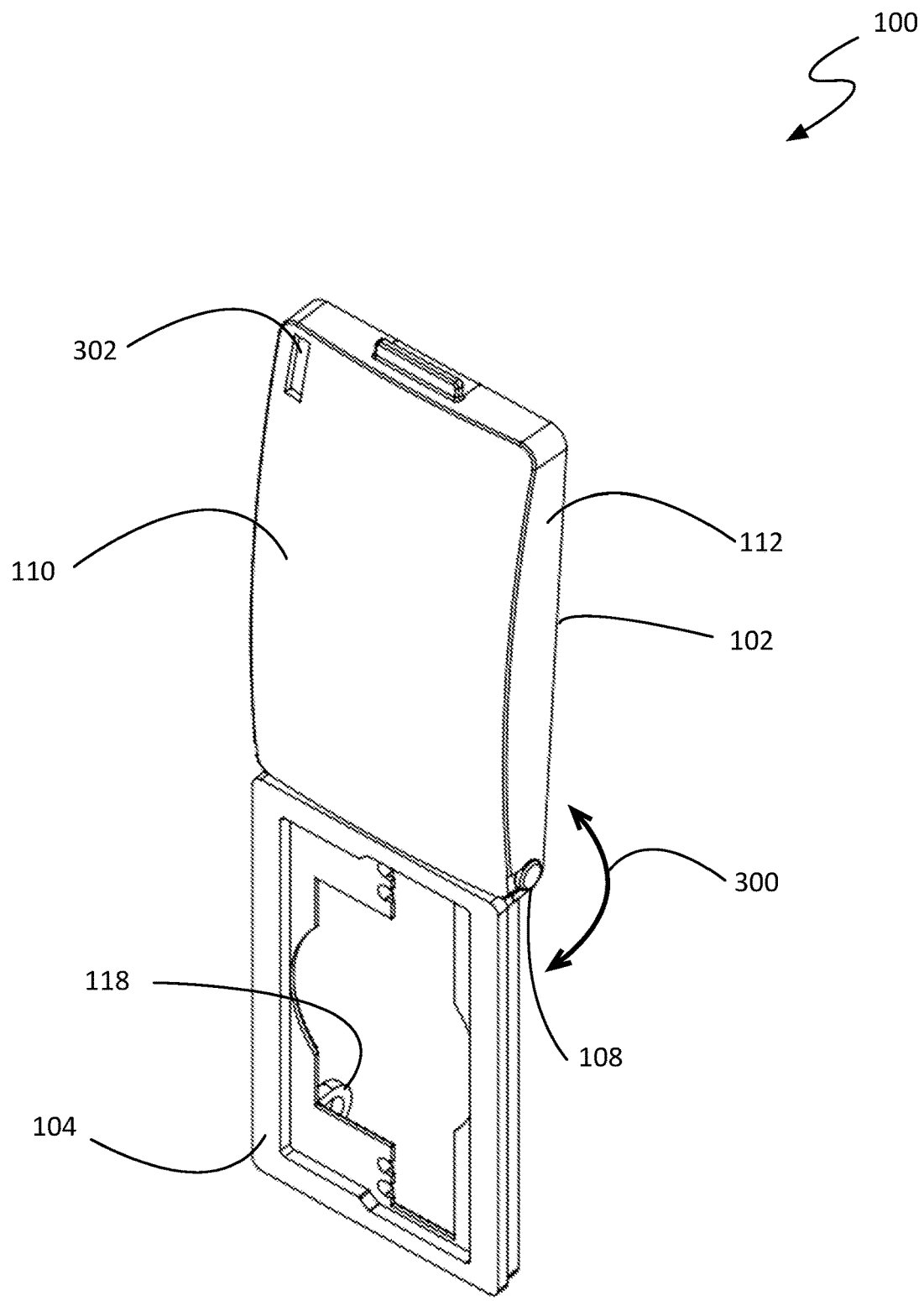
FIG. 3 is a rear perspective view of an electrical outlet cover assembly in an open position.
Figure 4:
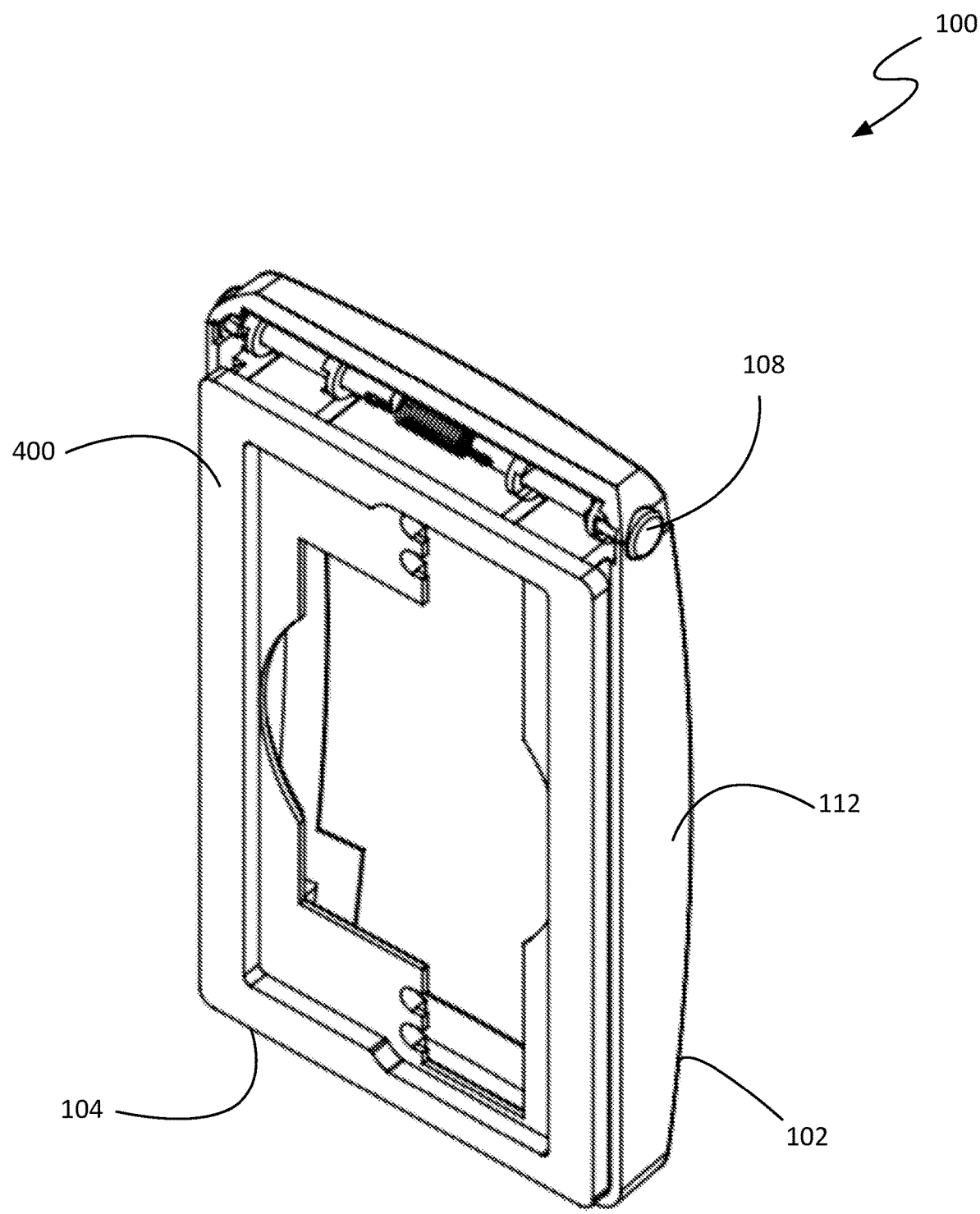
FIG. 4 is a rear perspective view of an electrical outlet cover assembly in a closed position.

FIGS. 1-4 depict perspective views of a non-limiting example of an electrical outlet cover assembly 100. In the exemplary embodiment illustrated, the electrical outlet cover assembly 100 comprises a lid 102, a base 104, a first pin 106, a second pin 108, a bias element 116, a lock receiver 118, and a lock aperture 302, according to various embodiments. FIGS. 1A and 3 show assembly 100 in an open position 120, while FIGS. 2 and 4 show assembly 100 in a closed position 200.

FIG. 1B shows a close-up view of the non-limiting example of assembly 100 shown in FIG. 1A. As shown, the lid 102 is hingedly coupled to the base 104 by the first pin 106 and the second pin 108, which are positioned within hinge apertures located on the base 104 and lid 102. The first pin 106 and the second pin 108 are coupled to each other by a bias element 116.

Conventional low profile cover assemblies for electrical devices and outlets often employ a biased hinge to keep the lid closed when the outlet is not in use. The biased hinge helps prevent the lid from being inadvertently blown open or accidentally left only partially closed. However, in conventional assemblies, this utility comes at a cost. The bias elements used by these conventional assemblies can be divided into two main groups: flat springs and torsional springs. The assemblies that include flat springs typically have the disadvantage of the lid only opening to about 90°. While the enclosures with torsional springs do allow the lid to open further (though not completely), they can be very difficult (and thus more expensive) to assemble.

Advantageously, an electrical outlet cover assembly 100 may make use of a torsional bias element 116 without sacrificing ease of assembly or the range of motion of the lid 102, according to various embodiments. As shown in FIGS. 1-4, the first pin 106 and the second pin 108 are coupled to each other by a bias element 116. One of the pins (here, the first pin 106) is rotationally fixed with respect to the lid 102, while the other pin (here, the second pin 108) is rotationally fixed with respect to the base 104. Movement of the lid 102 with respect to the base 104 by operation of the hinge causes the pins to rotate with respect to each other, twisting the bias element 116, which drives the lid 102 toward a closed position 200. The pins and bias element 116 will be discussed in greater detail with respect to FIGS. 7 and 8. In particular, the ease of assembly and adjustment will be discussed with respect to FIG. 7A.

In the non-limiting example depicted in FIGS. 1-4, the first pin 106 is rotationally fixed with respect to the first lid hinge aperture 124 and rotatably coupled to the first base hinge aperture 128, while the second pin 108 is rotatably coupled to the second lid hinge aperture 126 and rotationally fixed with respect to the second base hinge aperture 130. For the purpose of clarity, the rest of the non-limiting examples depicted in the other Figures, as well as those discussed in the disclosure, will be configured in a similar fashion. However, it should be noted that in other embodiments, equivalently, the first pin 106 may be rotationally fixed to the first base hinge aperture 128 and rotatably coupled to the first lid hinge aperture 124, while the second pin 108 may be rotationally fixed to the second lid hinge aperture 126 and rotatably coupled to the second base hinge aperture 130.

In the context of the present description and the claims that follow, the closed position 200 of an electrical outlet cover assembly 100 refers to the lid 102 and the base 104 being positioned relative to each other such that access to the electrical device is blocked and the lid cannot hinge any closer to the base. In some embodiments, the closed position 200 may describe a configuration of the base 104 and lid 102 wherein a majority of the face 110 of the lid 102 is as close as possible to a majority of the base 104. In some embodiments, the closed position 200 may describe a configuration wherein the base 104 is contained within a lid skirt 112 of the lid 102. The lid 102 will be discussed in greater detail with respect to FIGS. 5A-5C.

In the context of the present description and the claims that follow, an open position 120 of an electrical outlet cover assembly 100 refers to any configuration of a lid 102 with respect to the base 104 to which the lid 102 is hingedly coupled which is not in a closed position 200, and may be associated with an angle.

The use of a torsional bias element 116 allows assembly 100 to open further than possible in conventional cover assemblies making use of flat springs. An open position 120 of an assembly 100 may be quantified by an angle 300 (see, for example, FIG. 3). In some embodiments, angle 300 may refer to the angle between a substantially planar rear surface 400 of the base 104 and a majority of a lower edge 114 of the lid skirt 112. In other embodiments, an angle 300 associated with an open position 120 may refer to the rotational phase of one pin with respect to the other pin, relative to their phase when the assembly 100 is in a closed position 200. The rotational phases of pins will be discussed in greater detail with respect to FIGS. 7A and 7B.

In some embodiments, open position 120 may be associated with an angle of at least 140°. In other embodiments, the structure of the hinge apertures of the base 104 may allow for greater angles, even as far as 180°. The hinge apertures of the base 104 will be discussed in greater detail with respect to FIGS. 6A-6C. Additionally, the non-limiting example of an electrical outlet cover assembly 100 shown in FIGS. 1-4 are depicted in a vertical orientation. In other embodiments, the assembly 100 may be oriented in a horizontal fashion, as is known in the art.

The non-limiting examples shown in FIGS. 1-10 depict bias element 116 as a torsional spring. In the context of the present description and the claims that follow, bias element 116 is a structure that provides both rotational and linear bias. More specifically, according to various embodiments, bias element 116 provides rotational bias that resists rotation or twisting about an axis, and also linear bias that resists stretching or compressing along that same axis. Bias element 116 may be composed of any material known in the art for coil springs or other biasing or tensioning devices. The role of bias element 116 will be discussed in greater detail with respect to FIGS. 7A and 8A.

Conventional low profile cover assemblies for electrical devices and outlets use small hinge features that may be easily broken. Furthermore, while state-of-the-art cover assemblies may be configured to receive a padlock, the small hinge features and/or separate hinge pins remain vulnerable to mechanical failure. Advantageously, cover assembly 100 makes use of more robust pins and hinge apertures, as will be discussed in greater detail with respect to FIGS. 5-7.

Additionally, the linear bias 802 of bias element 116 may serve to prevent the separate hinge pins (e.g. first pin 106, second pin 108) from being removed. The linear bias 802 will be discussed in greater detail with respect to FIGS. 8A and 8B. In some embodiments, the lid 102 and pins may be shaped such that access is difficult when the assembly 100 is in a closed position 200. See, for example, the non-limiting example shown in FIG. 1B. As shown, the pins each comprise a head 132 having a top surface 134. The outer surface 136 of the lid skirt 112 has a countersink 138 around each pin, such that the top surfaces 134 are flush with the outer surface 136, inhibiting access to the pins. In some embodiments, the countersinks 138 may have a notch pointed toward the lower edge 114 of the lid skirt 114. In this way, the pins may be easy to access when the assembly 100 is in an open position 120 (e.g. authorized access), but are flush with the skirt (and thus hard to access) when the assembly 100 is in a closed position 200.

Embodiments of an electrical outlet cover assembly 100, and implementing components, may be composed of a wide variety of materials known in the art. For example, the components may be formed of: metals; polymers such as thermoplastics (such as ABS, Fluoropolymers, Polyacetal, Polyamide; Polycarbonate, Polyethylene, Polysulfone, and/ or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Figure 5A:
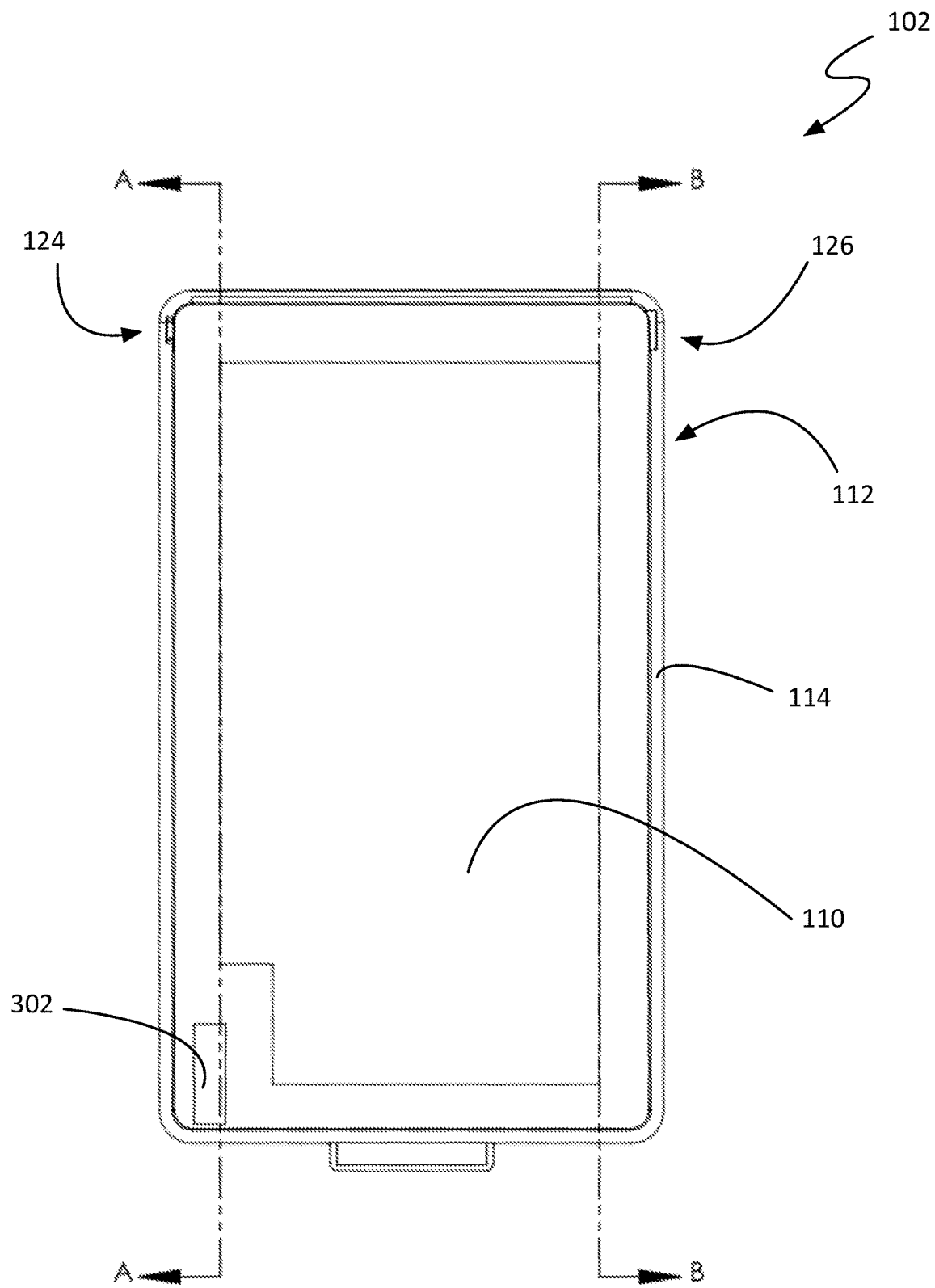
FIG. 5A is a rear view of a lid.
Figure 5B:
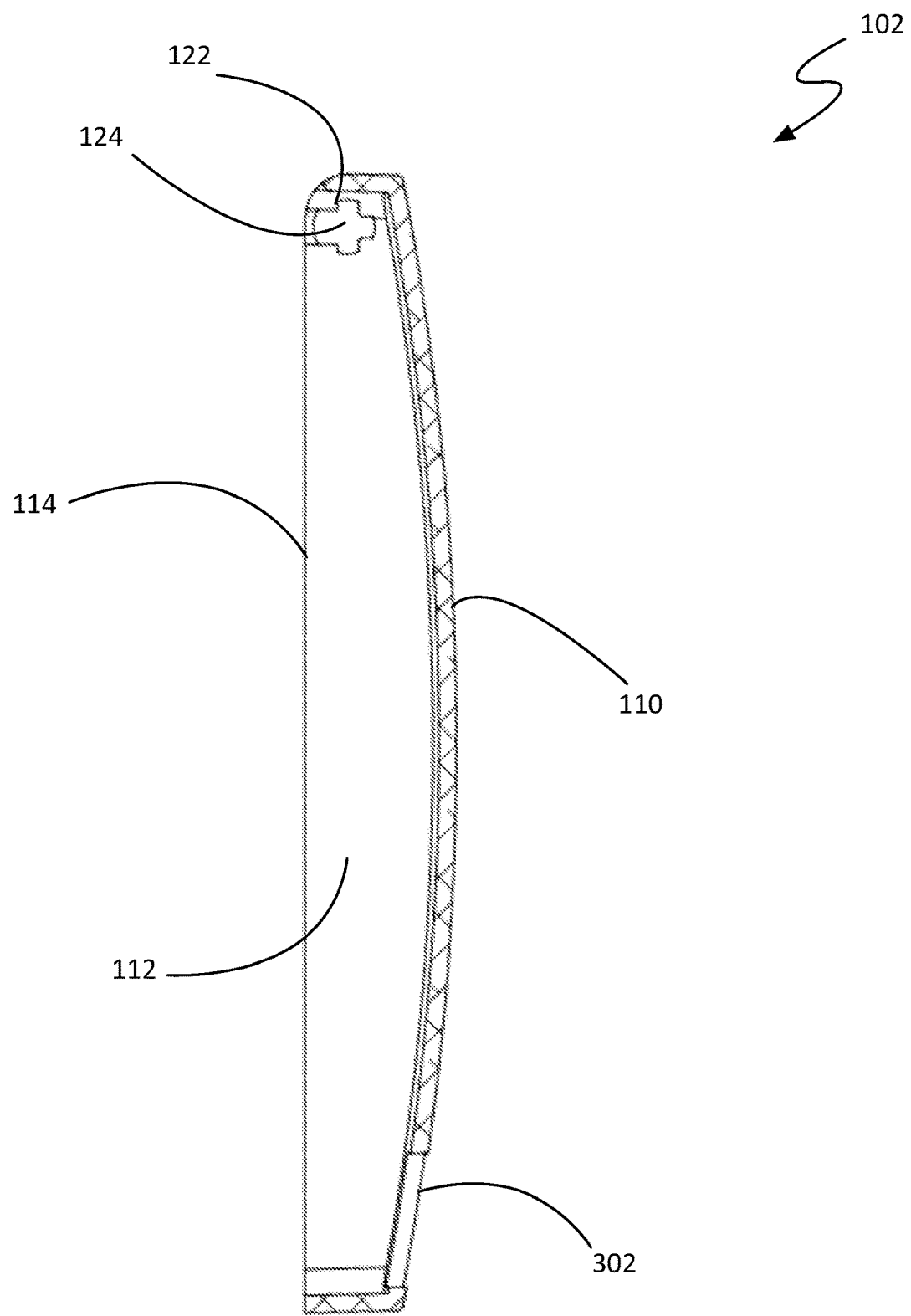
FIG. 5B is a cross-sectional view of the lid of FIG. 5A, along A-A.
Figure 5C:
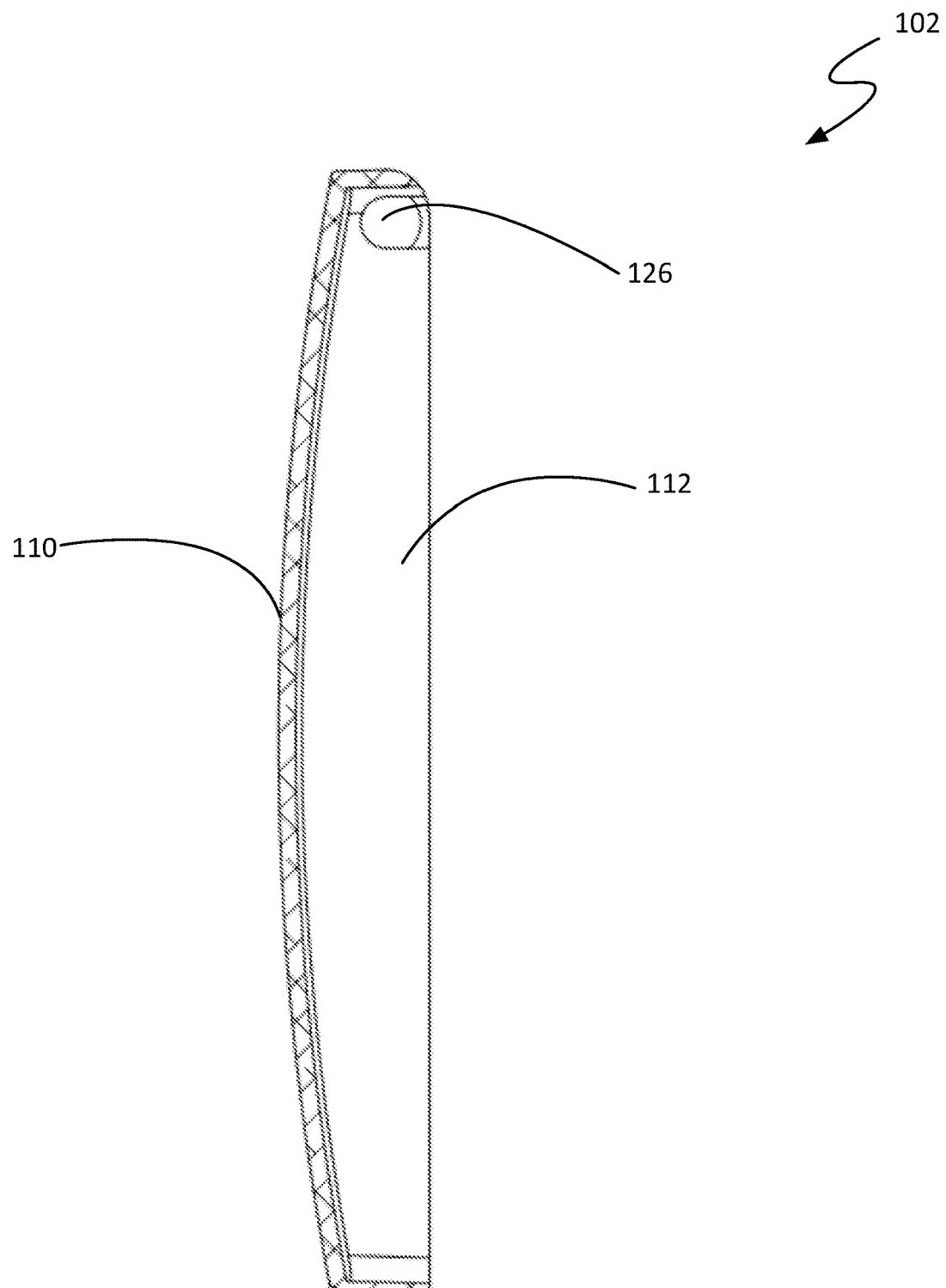
FIG. 5C is a cross-sectional view of the lid of FIG. 5A, along B-B.

FIGS. 5A-5C depict a non-limiting example of a lid 102. Specifically, FIG. 5A is a rear view of a lid 102 (i.e. the inside of the lid), while FIGS. 5B and 5C show cross-sectional views of lid 102 along the lines A-A and B-B of FIG. 5A, respectively. As shown, the lid 102 has a lid face 110 which may be bordered by a lid skirt 112, as well as a first lid hinge aperture 124, a second lid hinge aperture 126, and a lock aperture 302, according to various embodiments.

In the context of the present description and the claims that follow, a lid face 110 refers to the portion of the lid 102 that is, on average, roughly parallel to the base 104, while the lid skirt 112 refers to the portion of the lid 102 that borders the lid face 110 and runs towards the base 104. In the non-limiting example shown in FIGS. 5A-5C, the lid face 110 is slightly curved and makes up the majority of the lid 102, while the lid skirt 112 runs roughly perpendicular to the base 104 and meets the lid face 110 at a rounded corner of roughly 90 degrees. In some embodiments, the boundary between the lid face 110 and the lid skirt 112 may be clearly defined (e.g. a corner, etc.), while in other embodiments, the lid face 110 may smoothly transition into the lid skirt 112 without any well defined corners, to minimize the possibility that something will catch on the low profile enclosure 100. As shown, the lid face 110 may be curved. In other embodiments, the lid face 110 may be flat, or take on any other shape adapted for a particular use (e.g. lid face 110 may be shaped to fit a particular electrical device or outlet, etc.).

As shown, the lid skirt 112 has a lower edge 114 that extends around the skirt. In some embodiments, the lower edge 114 may be essentially planar, and the skirt 112 may be sized such that when assembly 100 is in a closed position 200, the base 104 is entirely enclosed within the lid 102. This may be advantageous for preventing unauthorized access to the inside of the enclosure. In other embodiments, including the non-limiting example shown in FIG. 2, a part of the base 104 may still be visible when the assembly 100 is in a closed position 200.

According to various embodiments, the lid 102 comprises a first lid hinge aperture 124 and a second lid hinge aperture 126. As previously discussed, the first pin 106 is rotationally fixed with respect to the first lid hinge aperture 124. In some embodiments, the first pin 106 may be permanently or semi-permanently coupled inside the first lid hinge aperture such that it is rotationally fixed through any of the various methods known in the art, such as welding, adhesives, or the like. In other embodiments, the first pin 106 may be releasably coupled to the first lid hinge aperture 124. For example, in FIGS. 1-4, the first pin 106 comprises teeth 122, and the first lid hinge aperture also comprises teeth 122 complementary to those of the first pin 106 (see, for example, FIG. 5B). When the teeth 122 of the pin are engaged within the first lid hinge aperture 124, the first pin 106 is rotationally fixed.

As previously discussed, the second pin 108 is rotatably coupled to the second lid hinge aperture 126. As shown in FIGS. 5A-5C, the first and second lid hinge apertures may be part of the lid skirt 112. In other embodiments, the first and second lid hinge apertures may be situated elsewhere. In various embodiments, the lid 102 may comprise additional hinge apertures to provide additional strength to the assembly 100. In some embodiments, the lid may only have one hinge aperture. Such embodiments will be discussed in greater detail with respect to FIG. 9.

The non-limiting example of a lid 102 shown in FIGS. 5A-5C further comprises a lock aperture 302. The lock aperture 302 may be sized to allow the passage of a lock receiver 118 located on the base 103 to pass through when the assembly 100 is in a closed position 200. In some embodiments, the lock aperture 302 may simply be an opening in the lid 102. In other embodiments, the lock aperture 302 may include additional structure inside the lid 102 to isolate the interior of the assembly from the exterior while still allowing a lock receiver 118 to pass through.

Figure 6A:
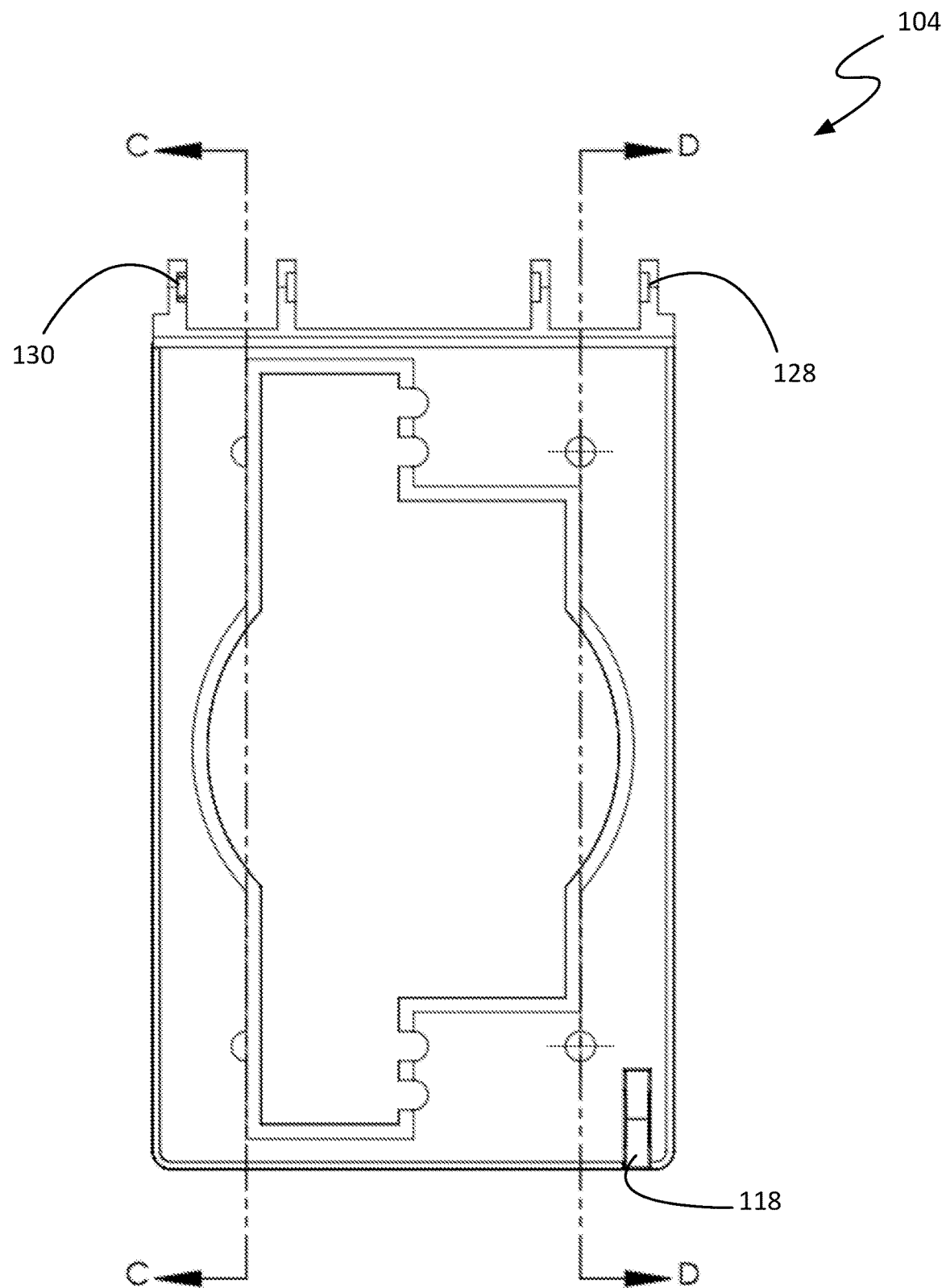
FIG. 6A is a front view of a base.
Figure 6B:
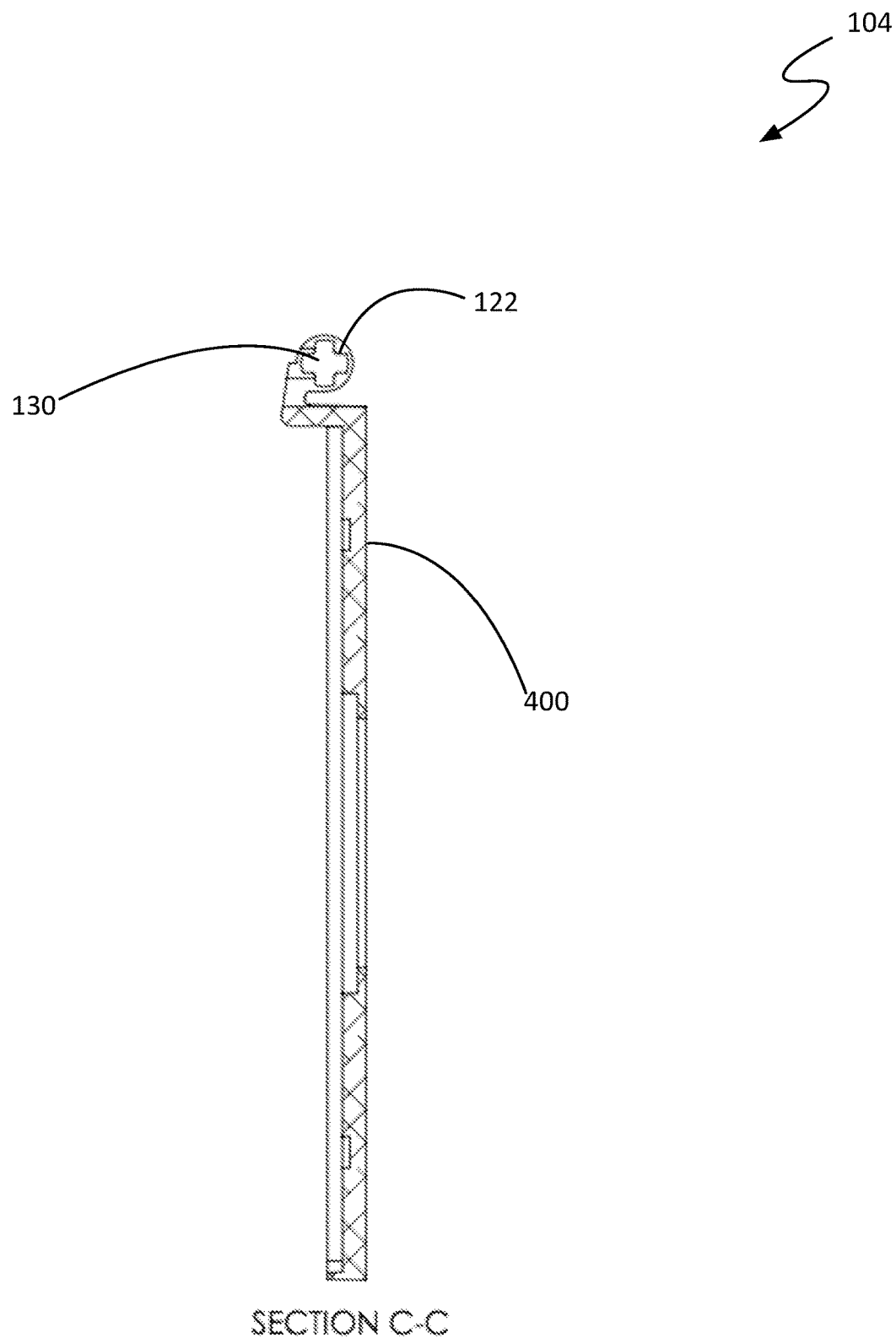
FIG. 6B is a cross-sectional view of the base of FIG. 6A, along C-C.
Figure 6C:
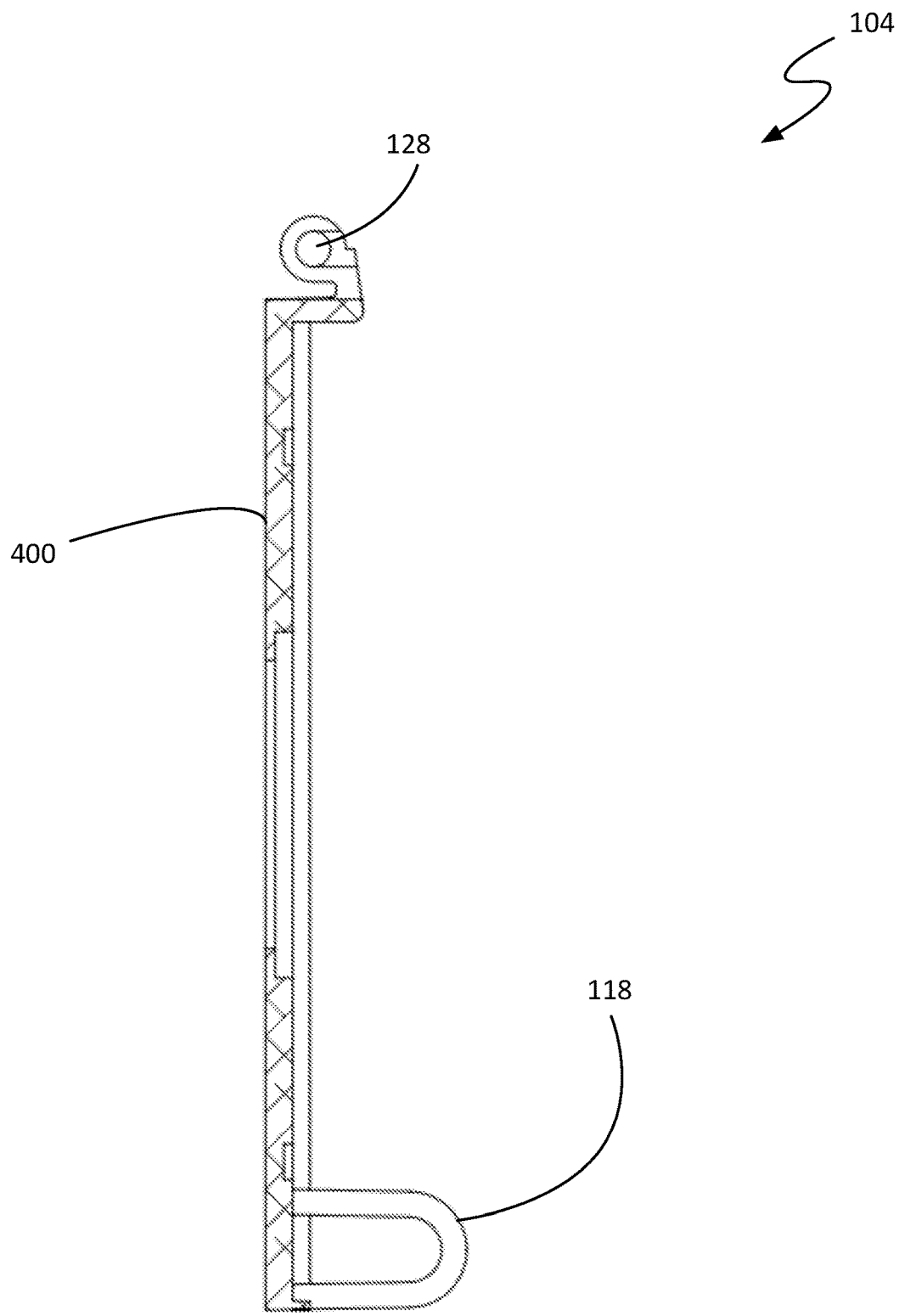
FIG. 6C is a cross-sectional view of the base of FIG. 6A, along D-D.

FIGS. 6A-6C depict a non-limiting example of a base 104. Specifically, FIG. 6A is a front view of a base 104, while FIGS. 6B and 6C show cross-sectional views of base 104 along the lines C-C and D-D of FIG. 6A, respectively. As shown, the base 104 comprises a first base hinge aperture 128, a second base hinge aperture 130, a lock receiver 118, and a rear surface 400, according to various embodiments.

As previously discussed, in some embodiments, the second pin 108 may be rotationally fixed with respect to the base 104. In the non-limiting examples shown in the Figures, the second base hinge aperture 130 is toothed complimentary to teeth 122 on the second pin 108. In some embodiments, the base 104 may further comprise additional hinge apertures to provide stability and strength to the hinge.

As shown in the cross-sectional views depicted in FIGS. 6B and 6C, the base hinge apertures may be located away from the rest of the base 104, and connected to the rest of the base 104 through an upper support member such that a space or void exists between at least part of the aperture and the rest of the base 104. This may be advantageous, as the space allows the lid 102 to open fully (e.g. 180 degrees) with respect to the base 104, as the lid skirt 112 is able to rotate into the void.

In use, electrical outlet cover assembly 100 may be attached to an object proximate to an electrical outlet through the base 104. In some embodiments, a base 104 may be configured to receive an adapter, such as adapter 121 of FIG. 1. Adapters 121 may be configured to receive one or more of various types of electrical outlets or devices known in the art. The object proximate to the electrical outlet may comprise various items, such as a wall, a ceiling, or a floor in a house, an outcropping or island (such as a kitchen island) in a house, another structure in a house, a portion of a vehicle, a portion of a machine, an electrical outlet mounting box or any other item. According to various embodiments, the assembly 100 may be attached by screws, bolts, nails, or the like which pass through holes in the base 104. Advantageously, the points of attachment may be contained within the lid 102 when the assembly 100 is in a closed position, preventing unauthorized access.

According to various embodiments, base 104 (as well as lid 102) may be sized and configured for use with electrical outlets and devices that vary in type (e.g. standard outlet, GCFI outlet, etc.) and number (e.g. 1-gang, 2-gang, etc.). In one particular implementation, the base 104 may comprise an adaptable plate comprising removable or punch-out portions allowing it to adapt to various types of electrical outlets. For instance the adaptable plate may be adaptable to receive a standard outlet, or a GCFI outlet, and so forth, according to the portions of the adaptable plate that are selectively punched out or removed. As such, the base 104 may be manufactured such that the opening is not formed until the user punches out or removes certain portions of the adaptable plate. In other embodiments, the base 104 may be configured at the time of manufacture to receive a particular size and type of outlet or device.

As shown, the base 104 may comprise a lock receiver 118 configured for use with a padlock to secure the lid 102 in a closed position 200. In some embodiments, the lock receiver 118 may be an integral part of the base 104. In other embodiments, the lock receiver 118 may be a separate piece. As a specific example, lock receiver 118 may be constructed out of a strong material, such as a metal, and may further comprise one or more holes for receiving screws or other fasteners. This may fortify the lock receiver 118, an obvious target for achieving unauthorized access to the inside of the assembly 100, against mechanical failure.

Figure 7A:
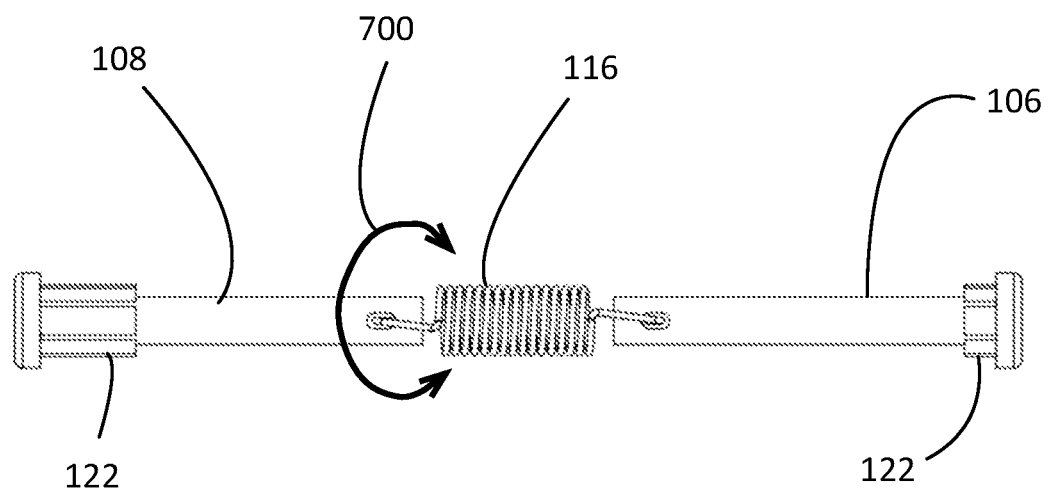
FIG. 7A is a front view of a first pin coupled to a second pin through a bias element with a relative rotational bias of 0°.
Figure 7B:
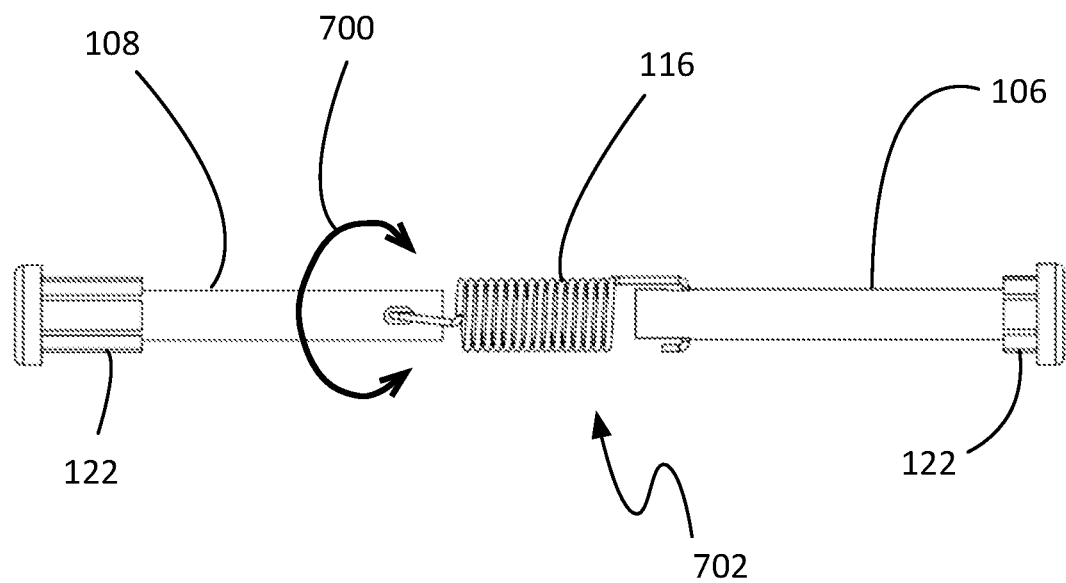
FIG. 7B is a front view of the first pin, second pin, and bias element of FIG. 7A, with a relative rotational bias of 90°.

FIGS. 7A and 7B depict a non-limiting example of a first pin 106 directly coupled to a second pin 108 by a bias element 116 which provides rotational bias 700. If we define FIG. 7A as showing the pins having a relative rotational phase 702 of 0 degrees, then FIG. 7B is a non-limiting example of the first and second pins having a relative rotational phase 702 of 90 degrees.

In the context of the present description and the claims that follow, a relative rotational phase 702 between a first pin 106 and a second pin 108 refers to the relative rotational offset of the first pin 106 with respect to the second pin 108 in comparison to a neutral configuration (e.g. the configuration associated with the removal of any force opposing the rotational bias 700). In some embodiments, where the bias element 116 is a torsional spring, the strength of the rotational bias 700 may increase with the magnitude of the relative rotational phase 702.

According to various embodiments, the first pin 106 and the second pin 108 may comprise teeth 122 configured to engage hinge apertures in the lid 102 and base 104. In the non-limiting example shown in FIGS. 7A and 7B, the first pin 106 is designed to engage with teeth inside of the first lid hinge aperture 124, and the second pin 108 is designed to engage with teeth inside of the second base hinge aperture 130. As shown in previous Figures, the base hinge apertures may be situated further inside the assembly 100 than lid hinge apertures. As such, the teeth 122 may be longer on the second pin 108 than on the first 106, according to various embodiments. In other embodiments, the first pin 106 and the second pin 108 may be identical, each having teeth which may reach the innermost hinge apertures which have teeth, with the appropriate hinge apertures sized to be rotatably coupled to the teeth of the pin.

Figure 10:
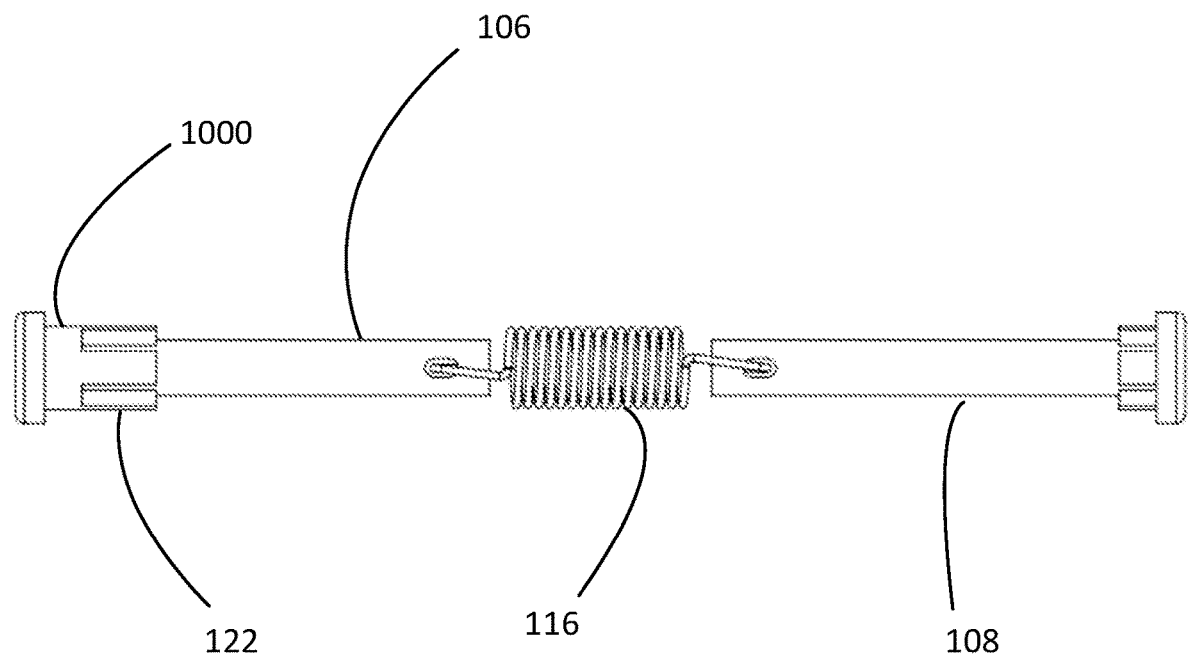
FIG. 10 is a front view of an alternative embodiment of a first pin coupled to a second pin through a bias element.

In other embodiments, such as the non-limiting example shown in FIG. 10, a pin intended to be rotationally fixed with respect to an inner hinge aperture (e.g. the second pin 108, etc.) may comprise a round bearing 1000 to facilitate being rotatably coupled to an outer hinge aperture. In this way, the hinge aperture, which may be constructed of a plastic, is less likely to be worn down by the rotating teeth of a pin.

One of the advantages of the disclosed assembly 100 over the prior art is the ease of assembly. According to various embodiments, the bias element 116 may provide a linear bias 802 in addition to a rotational bias 700. Some embodiments may take advantage of this linear bias; as shown in FIG. 7B the pins couple with the bias element 116 by receiving hooked ends of the bias element 116 through holes in the ends of the pins. The holes may be made large enough to easily receive the hooked ends, relying upon the linear bias to prevent unintentional decoupling of the pins from the bias element.

Figure 8A:
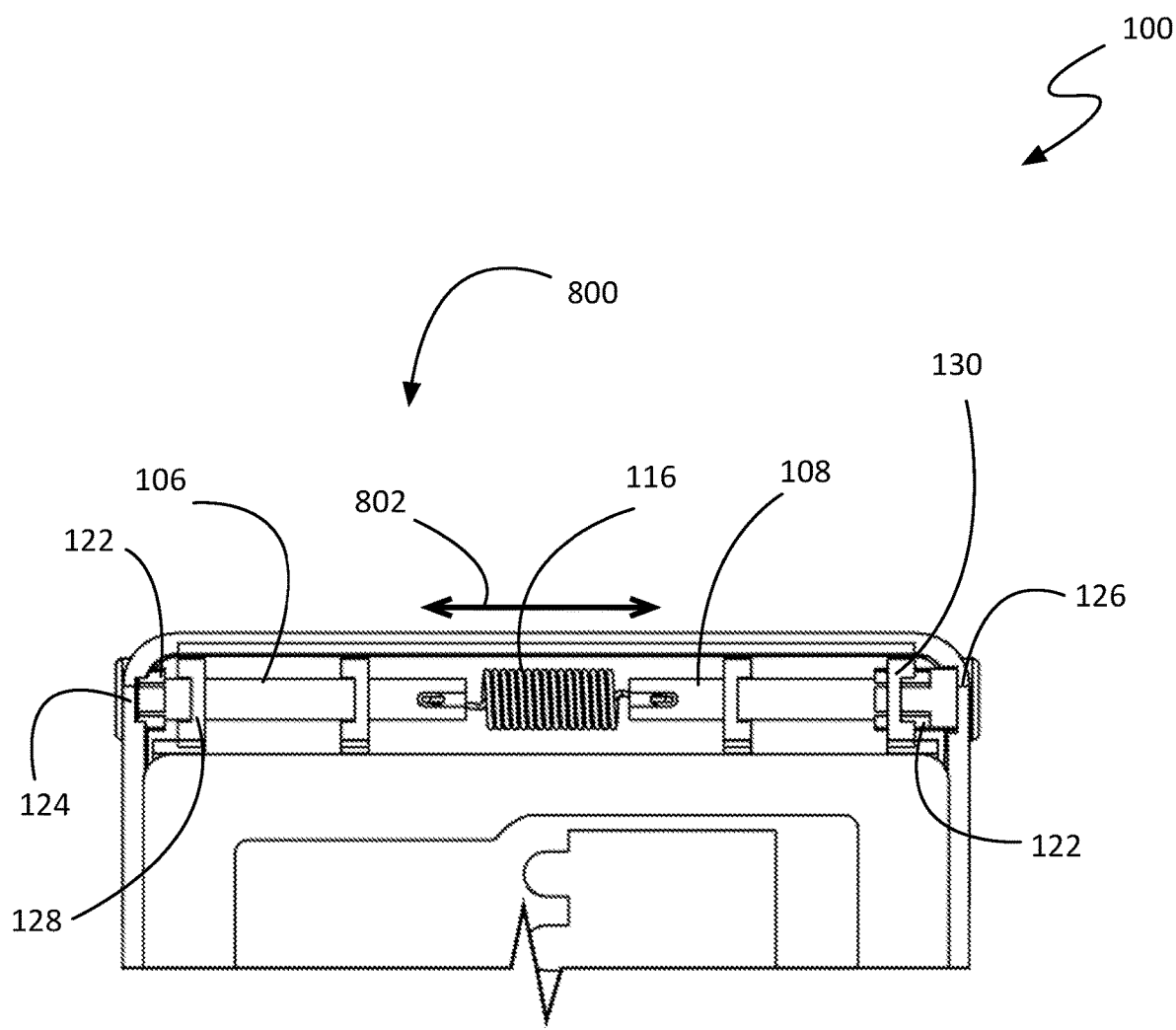
FIG. 8A is a close-up rear view of an electrical outlet cover assembly with a first pin in an engaged position.
Figure 8B:
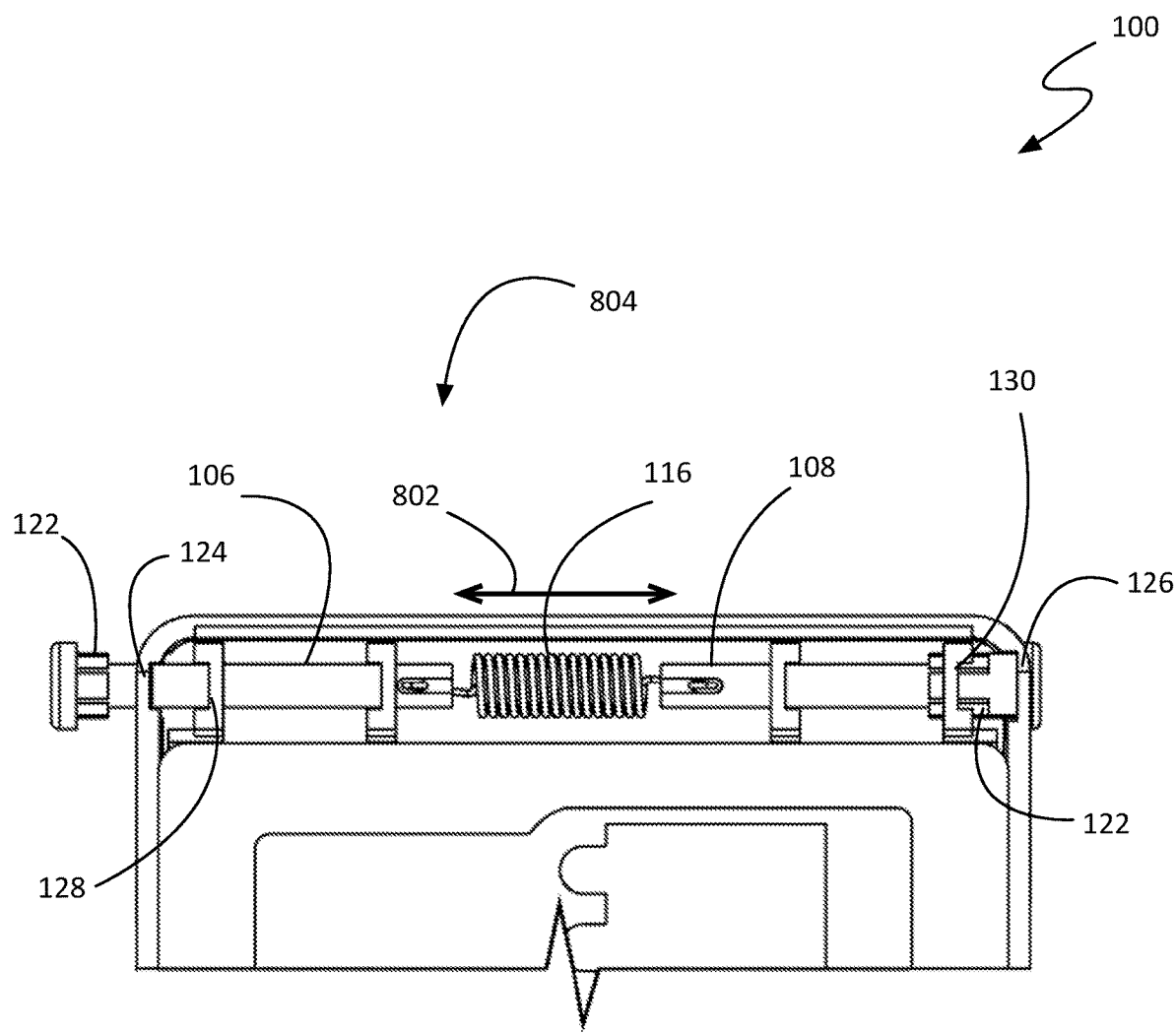
FIG. 8B is a close-up rear view of the electrical outlet cover assembly of FIG. 8A, with the first pin in a disengaged position.
Figure 9:
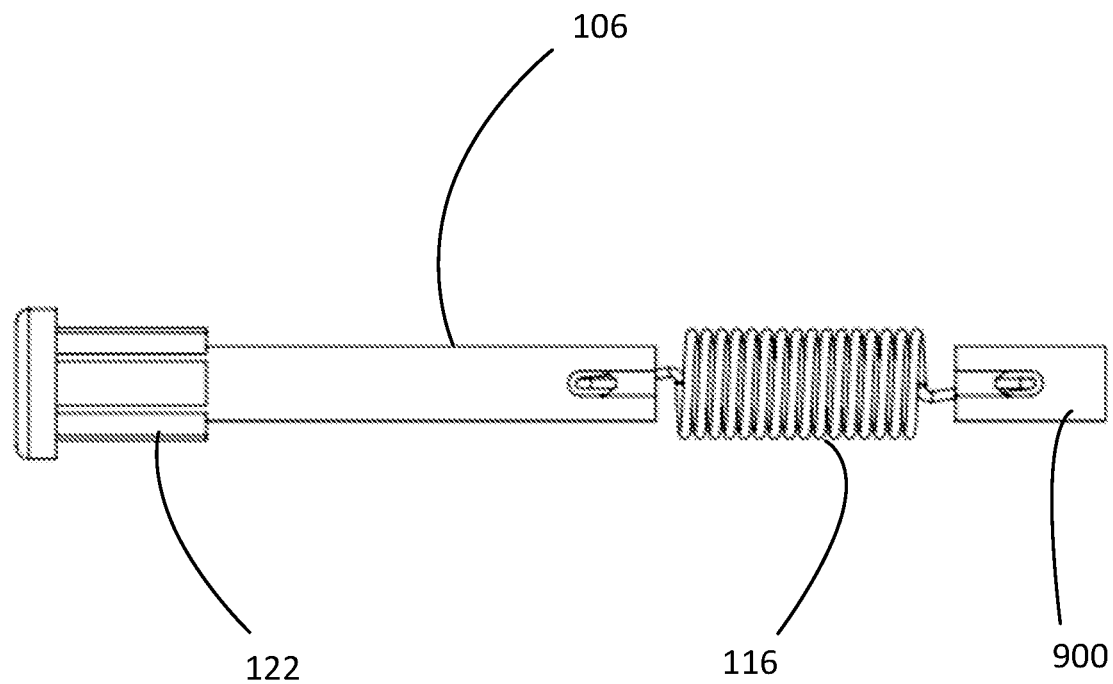
FIG. 9 is a front view of a first pin coupled to an anchor through a bias element.

Unlike the electrical device cover assemblies in the prior art, the hinge bias of assembly 100 may be adjustable. FIGS. 8A and 8B show a close-up rear view of a non-limiting example of assembly 100 with the first pin 106 in an engaged and disengaged position, respectively. In the context of the present description and the claims that follow, an engaged position of a pin refers to the teeth of the pin being engaged with the teeth inside a hinge aperture. Similarly, a disengaged position of a pin refers to the pin being removed far enough from the hinge aperture that the teeth of the pin no longer engage with the teeth inside a hinge aperture.

According to various embodiments, the rotational bias provided by the bias element 116 may be adjusted. For example, as shown in FIGS. 8A and 8B, one pin (e.g. first pin 106) may be pulled out until it is in a disengaged position 804, and then rotated to modify the relative rotational phase 702 of the pins and adjust the rotational bias. Once the desired rotational bias has been achieved, the pin may be put back into the assembly into an engaged position 800. The linear bias 802 provided by the bias element 116 may serve to prevent accidentally putting a pin in a disengaged position 804. Having an adjustable rotational bias is advantageous over the prior art as it may reduce the reject rate during manufacturing (e.g. bias may be increased in cases where the lid is not closing, etc.).

In some embodiments, an assembly 100 may make use of a first pin 106 and a second pin 108. In other embodiments, an assembly 100 may make use of a single pin in conjunction with some form of pivot (e.g. a pin, rivet, screw, peg, etc.). See, for example, FIG. 9, which depicts a non-limiting example of a first pin 106 directly coupled to an anchor 900 through a bias element 116. In the context of the present description and the claims that follow, and anchor 900 refers to a structure configured to couple with a bias element 116 and is fixedly coupled to either the lid 102 or the base 104. As a specific example, an anchor 900 may be an integral part of the base 104, and thereby serving the role of a second pin rotationally fixed with respect to the base.

The anchor 900 may be boss attached to the lid 102 or the base 104, according to some embodiments. In other embodiments, the anchor 900 may be an integral part of the base 104 or the lid 102. For example, the anchor 900 may be a hole in part of the base 104 that is sized to receive a hook on the end of a bias element 116.

Where the above examples, embodiments and implementations reference examples, it should be understood by those of ordinary skill in the art that other electrical outlet cover assemblies and manufacturing methods and examples could be intermixed or substituted with those provided. In places where the description above refers to particular embodiments of electrical outlet cover assemblies, it should be readily apparent that a number of modifications may be made without departing from the spirit thereof and that these embodiments and implementations may be applied to other to cover assemblies as well. Accordingly, the disclosed subject matter is intended to embrace all such alterations, modifications and variations that fall within the spirit and scope of the disclosure and the knowledge of one of ordinary skill in the art.

What is claimed is:

1. An electrical outlet cover assembly, comprising:
   a base comprising a first base hinge aperture and a second base hinge aperture; and
   a lid comprising a first lid hinge aperture, a second lid hinge aperture, and a lid face bordered by a lid skirt, the lid hingedly coupled to the base by a first pin rotatably coupled to the first base hinge aperture and rotationally fixed with respect to the first lid hinge aperture, and a second pin, separate from the first pin, rotationally fixed with respect to the second base hinge aperture and rotatably coupled to the second lid hinge aperture;
   wherein the lid is movable, with respect to the base, between a closed position in which the base is contained within the lid skirt and an open position in which an angle between a substantially planar rear surface of the base and a majority of a lower edge of the lid skirt is at least 140°;
   wherein the lid is biased from the open position to the closed position by a rotational bias from a bias element directly coupled to both the first pin and the second pin, wherein the first pin and the second pin each comprise teeth, the first lid hinge aperture is toothed complementary to the teeth of the first pin, the second base hinge aperture is toothed complementary to the teeth of the second pin, each pin of the first pin and the second pin is slideably movable between an engaged position in which the teeth of the pin are mated with one of the first lid hinge aperture and the second base hinge aperture and a disengaged position in which the pin is rotatably coupled to both the lid and the base and a relative rotational phase between the first pin and the second pin is adjustable through rotation of the pin, and wherein each pin of the first pin and the second pin is biased to the engaged position by a linear bias of the bias element, and a strength of the rotational bias of the bias element changes in response to adjustments of the relative rotational phase between the first pin and the second pin.

2. The electrical outlet cover assembly of claim 1, wherein the angle between the substantially planar rear surface of the base and the majority of the lower edge of the lid skirt while the lid is in the open position is 180°.

3. The electrical outlet cover assembly of claim 1 wherein the lid face comprises a lock aperture extending through the lid face, the base comprises a lock receiver, and the lock receiver extends through the lock aperture when the lid is in the closed position with respect to the base.

4. The electrical outlet cover assembly of claim 1, wherein each pin of the first pin and the second pin comprises a pin head having a top surface, and an outer surface of the lid skirt comprises a countersink for each of the first pin and the second pin such that, for each pin head, the top surface is substantially level with, or lower than, a majority of the outer surface of the lid skirt proximate to the pin head.

5. An electrical outlet cover assembly, comprising:
   a base comprising a first base hinge aperture and a second base hinge aperture; and
   a lid comprising a first lid hinge aperture, a second lid hinge aperture, and a lid face bordered by a lid skirt, the lid hingedly coupled to the base by a first pin rotatably coupled to the first base hinge aperture and rotationally fixed with respect to the first lid hinge aperture, and a second pin, separate from the first pin, rotationally fixed with respect to the second base hinge aperture and rotatably coupled to the second lid hinge aperture;
   wherein the lid is movable, with respect to the base, between a closed position and an open position, and is biased from the open position to the closed position by a rotational bias from a bias element directly coupled to both the first pin and the second pin;
   wherein the first pin and the second pin each comprise teeth, the first lid hinge aperture is toothed complementary to the teeth of the first pin, the second base hinge aperture is toothed complementary to the teeth of the second pin, each pin of the first pin and the second pin is slideably movable between an engaged position in which the teeth of the pin are mated with one of the first lid hinge aperture and the second base hinge aperture and a disengaged position in which the pin is rotatably coupled to both the lid and the base and a relative rotational phase between the first pin and the second pin is adjustable through rotation of the pin, and wherein each pin of the first pin and the second pin are biased to the engaged position by a linear bias of the bias element, and a strength of the rotational bias of the bias element changes in response to adjustments of the relative rotational phase between the first pin and the second pin.

6. The electrical outlet cover assembly of claim 5, wherein the lid further comprises a lid face bordered by a lid skirt, and the base is contained within the lid skirt when the lid is in the closed position with respect to the base.

7. The electrical outlet cover assembly of claim 5, wherein the lid further comprises a lid face bordered by a lid skirt having a lower edge, and an angle between a substantially planar rear surface of the base and a majority of the lower edge of the lid skirt is at least 140° when the lid is in the open position with respect to the base.

8. The electrical outlet cover assembly of claim 7, wherein the angle between the substantially planar rear surface of the base and the majority of the lower edge of the lid skirt while the lid is in the open position is 180°.

9. The electrical outlet cover assembly of claim 5, wherein the lid face comprises a lock aperture extending through the lid face, the base comprises a lock receiver, and the lock receiver extends through the lock aperture when the lid is in the closed position with respect to the base.

10. The electrical outlet cover assembly of claim 5, wherein the lid further comprises a lid face bordered by a lid skirt having an outer surface, and wherein each pin of the first pin and the second pin comprises a pin head having a top surface, and an outer surface of the lid skirt comprises a countersink for each of the first pin and the second pin such that, for each pin head, the top surface is substantially level with, or lower than, a majority of the outer surface of the lid skirt proximate to the pin head.

11. An electrical outlet cover assembly, comprising:
a base comprising a first base hinge aperture; and
a lid comprising a first lid hinge aperture, the lid hingedly coupled to the base by at least a first pin, the first pin rotatably coupled to one of the first lid hinge aperture and the first base hinge aperture, and rotationally fixed with respect to the other of the first lid hinge aperture and the first base hinge aperture;
wherein the lid is biased from an open position to a closed position by a rotational bias from a bias element mechanically engaged with an end of the first pin and with a second pin rotationally fixed with respect to one of the lid and the base, wherein the first pin further comprises teeth, the one of the first lid hinge aperture and the first base hinge aperture to which the first pin is rotationally fixed is toothed complementary to the teeth of the first pin, and the other of the first lid hinge aperture and the first base hinge aperture to which the first pin is rotatably coupled is toothless, the first pin is slideably movable between an engaged position in which the teeth of the first pin are mated with the teeth of one of the first lid hinge aperture and the first base hinge aperture, and a disengaged position in which the first pin is rotatably coupled to both the lid and the base and a relative rotational phase between the first pin and the second pin is adjustable through rotation of the first pin, and wherein the first pin is biased to the engaged position by a linear bias of the bias element, and a strength of the rotational bias of the bias element changes in response to adjustments of the relative rotational phase between the first pin and the second pin.

12. The electrical outlet cover assembly of claim 11, wherein the lid further comprises a lid face bordered by a lid skirt, and the base is contained within the lid skirt when the lid is in the closed position with respect to the base.

13. The electrical outlet cover assembly of claim 12, wherein at least a portion of the lid skirt is between the first pin and a majority of the base when the lid is in the open position with respect to the base.

14. The electrical outlet cover assembly of claim 11, wherein: the lid further comprises a lid face bordered by a lid skirt having a lower edge, and an angle between a substantially planar rear surface of the base and a majority of the lower edge of the lid skirt is at least 140° when the lid is in the open position with respect to the base.

15. The electrical outlet cover assembly of claim 14, wherein the angle between the substantially planar rear surface of the base and the majority of the lower edge of the lid skirt while the lid is in the open position is 180°.

16. The electrical outlet cover assembly of claim 11, wherein the lid comprises a second lid hinge aperture, the base comprises a second base hinge aperture, the second pin is separate from the first pin, the bias element is directly coupled to the second pin, and wherein the second pin is rotatably coupled to the second hinge aperture of the one of the lid and the base to which the first pin is rotationally fixed, and rotationally fixed to the second hinge aperture of the one of the lid and the base to which the first pin is rotatably coupled.

17. The electrical outlet cover assembly of claim 11 wherein the lid face comprises a lock aperture extending through the lid face, the base comprises a lock receiver, and the lock receiver extends through the lock aperture when the lid is in the closed position with respect to the base.

18. The electrical outlet cover assembly of claim 11, wherein the first pin comprises a pin head having a top surface, and an outer surface of the lid skirt comprises a countersink for the first pin such that the top surface is substantially level with, or lower than, a majority of the outer surface of the lid skirt proximate to the first pin.

* * * * *